United States Patent
Laifenfeld et al.

(10) Patent No.: US 9,665,707 B2
(45) Date of Patent: May 30, 2017

(54) SYSTEMS AND METHODS FOR CYBER SECURITY OF INTRA-VEHICULAR PERIPHERALS POWERED BY WIRE

(71) Applicant: GM GLOBAL TECHNOLOGY OPERATIONS LLC, Detroit, MI (US)

(72) Inventors: Moshe Laifenfeld, Haifa (IL); Nadav Lavi, Ramat-Hasharon (IL)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 58 days.

(21) Appl. No.: 14/593,047

(22) Filed: Jan. 9, 2015

(65) Prior Publication Data

US 2016/0203310 A1    Jul. 14, 2016

(51) Int. Cl.
G06F 21/00    (2013.01)
G06F 21/44    (2013.01)
H04L 29/06    (2006.01)
H04L 29/08    (2006.01)

(52) U.S. Cl.
CPC ............ G06F 21/44 (2013.01); H04L 63/062 (2013.01); H04L 67/12 (2013.01)

(58) Field of Classification Search
CPC ...... G06F 21/44; H04L 63/0823; H04L 67/12
USPC .............................................................. 726/6
See application file for complete search history.

(56) References Cited

U.S. PATENT DOCUMENTS

| 4,459,591 | A | * | 7/1984 | Haubner | ................. | G08C 15/12 |
| | | | | | | 340/12.16 |
| 4,967,195 | A | * | 10/1990 | Shipley | ................... | G08B 7/06 |
| | | | | | | 340/286.06 |
| 5,131,085 | A | * | 7/1992 | Eikill | ...................... | G06F 15/17 |
| | | | | | | 710/110 |
| 7,778,739 | B2 | * | 8/2010 | Preston | ................... | B60R 25/00 |
| | | | | | | 701/1 |
| 8,841,987 | B1 | * | 9/2014 | Stanfield | ........... | G07C 9/00896 |
| | | | | | | 340/5.61 |
| 2001/0042137 | A1 | * | 11/2001 | Ota | ........................ | G01C 21/26 |
| | | | | | | 709/248 |
| 2003/0050009 | A1 | | 3/2003 | Kurisko et al. | | |

(Continued)

FOREIGN PATENT DOCUMENTS

EP    1575225 A2    9/2005
WO    2009042256 A2    4/2009

OTHER PUBLICATIONS

USPTO, Notice of Allowance and Fee(s) Due for U.S. Appl. No. 13/800,621 mailed Mar. 4, 2015.

(Continued)

*Primary Examiner* — Mahfuzur Rahman
(74) *Attorney, Agent, or Firm* — Lorenz & Kopf, LLP

(57) ABSTRACT

Systems and methods are provided for securing and authenticating a network of a vehicle. At least one network key is generated by an electronic control module and distributed to at least one remote device over a wired power line. At least one signed transmission having a signature based on the at least one network key is transmitted from the at least one remote device to the electronic control module over a communication channel on the network separate from the wired power line. The electronic control module authenticates and encrypts the at least one signed transmission and receives a data stream from the at least one remote device over the communication channel.

17 Claims, 4 Drawing Sheets

(56) References Cited

U.S. PATENT DOCUMENTS

| | | |
|---|---|---|
| 2006/0068760 A1 | 3/2006 | Hameed et al. |
| 2006/0089176 A1 | 4/2006 | Oki |
| 2008/0161047 A1 | 7/2008 | Witkowski et al. |
| 2008/0291047 A1* | 11/2008 | Summerford ...... G07C 9/00182 340/5.71 |
| 2008/0303648 A1 | 12/2008 | Day |
| 2009/0207004 A1* | 8/2009 | Ziska .................. B60R 25/2018 340/426.1 |
| 2010/0040234 A1* | 2/2010 | Alrabady ................ H04L 9/321 380/278 |
| 2011/0053575 A1 | 3/2011 | Veliu et al. |
| 2011/0183733 A1* | 7/2011 | Yoshida .................. A63F 13/12 463/1 |
| 2011/0184580 A1* | 7/2011 | Kawamoto ............... H02J 3/14 700/295 |
| 2011/0184585 A1* | 7/2011 | Matsuda ................... G06F 1/26 700/297 |
| 2011/0184586 A1* | 7/2011 | Asano ................... G05B 15/02 700/297 |
| 2012/0028607 A1 | 2/2012 | Tengler et al. |
| 2013/0217330 A1 | 8/2013 | Gardenfors et al. |
| 2015/0030336 A1* | 1/2015 | Tanaka .................. H04B 10/40 398/135 |

OTHER PUBLICATIONS

USPTO, Amendment After Final for U.S. Appl. No. 13/800,621 mailed Feb. 10, 2015.

The German Patent and Trade Mark Office, Office Action for German Patent Application No. 10 2014 202 931.7 mailed May 13, 2014.

Lavi, N., US Patent Application entitled "Vehicle Communications System and Method," filed on Mar. 13, 2013.

USPTO, Response to Office Action for U.S. Appl. No. 13/800,621, filed on Oct. 22, 2014.

USPTO, Office Action for U.S. Appl. No. 13/800,621, mailed Jul. 22, 2014.

USPTO, Final Office Action for U.S. Appl. No. 13/800,621, mailed Dec. 10, 2014.

* cited by examiner

SYSTEMS AND METHODS FOR CYBER SECURITY OF INTRA-VEHICULAR PERIPHERALS POWERED BY WIRE

TECHNICAL FIELD

The technical field generally relates to network security, and more particularly relates to systems and methods for network security for peripherals in a vehicle that are powered by a wire.

BACKGROUND

Most vehicles, such as automobiles, have various remote devices and vehicle systems that communicate with one another over networks or communication channels. For instance, communication channels such as wired communication busses allow electronic control modules, devices, vehicle actuators, sensors, or vehicle subsystems on the communication bus to communicate with one another within a vehicle. In addition, the network may be a wireless network in which devices on the network communicate with one another wirelessly. As wireless networks are used more frequently in vehicle subsystems, the reliability and security of these communication busses becomes essential.

Accordingly, it is desirable to provide systems and methods for securing and authenticating networks on a vehicle. Other desirable features and characteristics of the present invention will become apparent from the subsequent detailed description and the appended claims, taken in conjunction with the accompanying drawings and the foregoing technical field and background.

SUMMARY

Various embodiments of a method and a system for securing and authenticating a network on a vehicle equipped with a system for securing and authenticating a network are disclosed herein.

In a first non-limiting embodiment, the method includes, but is not limited to the step of generating at least one network key with an electronic control module. The method further includes, but is not limited to, distributing the at least one network key from the electronic control module to at least one remote device over a wired power line. The method further includes, but is not limited to, extracting the at least one network key from the wired power line with the at least one remote device. The method further includes, but is not limited to, transmitting at least one signed transmission including a signature based on the network key from the at least one remote device to the electronic control module over a communication channel on the network separate from the wired power line. The method further includes, but is not limited to, receiving with the electronic control module the at least one signed transmission from the at least one remote device. The method further includes, but is not limited to, authenticating the at least one signed transmission. The method further includes, but is not limited to, receiving with the electronic control module a data stream transmitted by the at least one remote device over the communication channel.

In another non-limiting embodiment, the system includes, but is not limited to, an electronic control module having a processor module and a memory module. The electronic control module is configured to generate at least one network key and send and receive signals over a communication channel on the network. The system further includes, but is not limited to, a wired power line network separate from the communication channel. The system further includes, but is not limited to, at least one remote device configured to receive power from the wired power line network and send and receive signals over the communication channel. The at least one network key is transmitted by the electronic control module over the wired power line network to the at least one remote device. A data stream, including at least one signed transmission having a signature based on the at least one network key, transmitted by the at least one remote device to the electronic control module over the communication channel is authenticated and encrypted based on the at least one network key.

In another non-limiting embodiment, the vehicle includes, but is not limited to, a network. The vehicle further includes, but is not limited to, a system for securing and authenticating the network. The system includes, but is not limited to, an electronic control module having a processor module and a memory module. The electronic control module is configured to generate at least one network key and send and receive signals over a communication channel on the network. The system further includes, but is not limited to, a wired power line network separate from the communication channel. The system further includes, but is not limited to, at least one remote device configured to receive power from the wired power line network and send and receive signals over the communication channel. The at least one network key is transmitted by the electronic control module over the wired power line network to the at least one remote device. A data stream, including at least one signed transmission having a signature based on the at least one network key, transmitted by the at least one remote device to the electronic control module over the communication channel is authenticated and encrypted based on the at least one network key.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
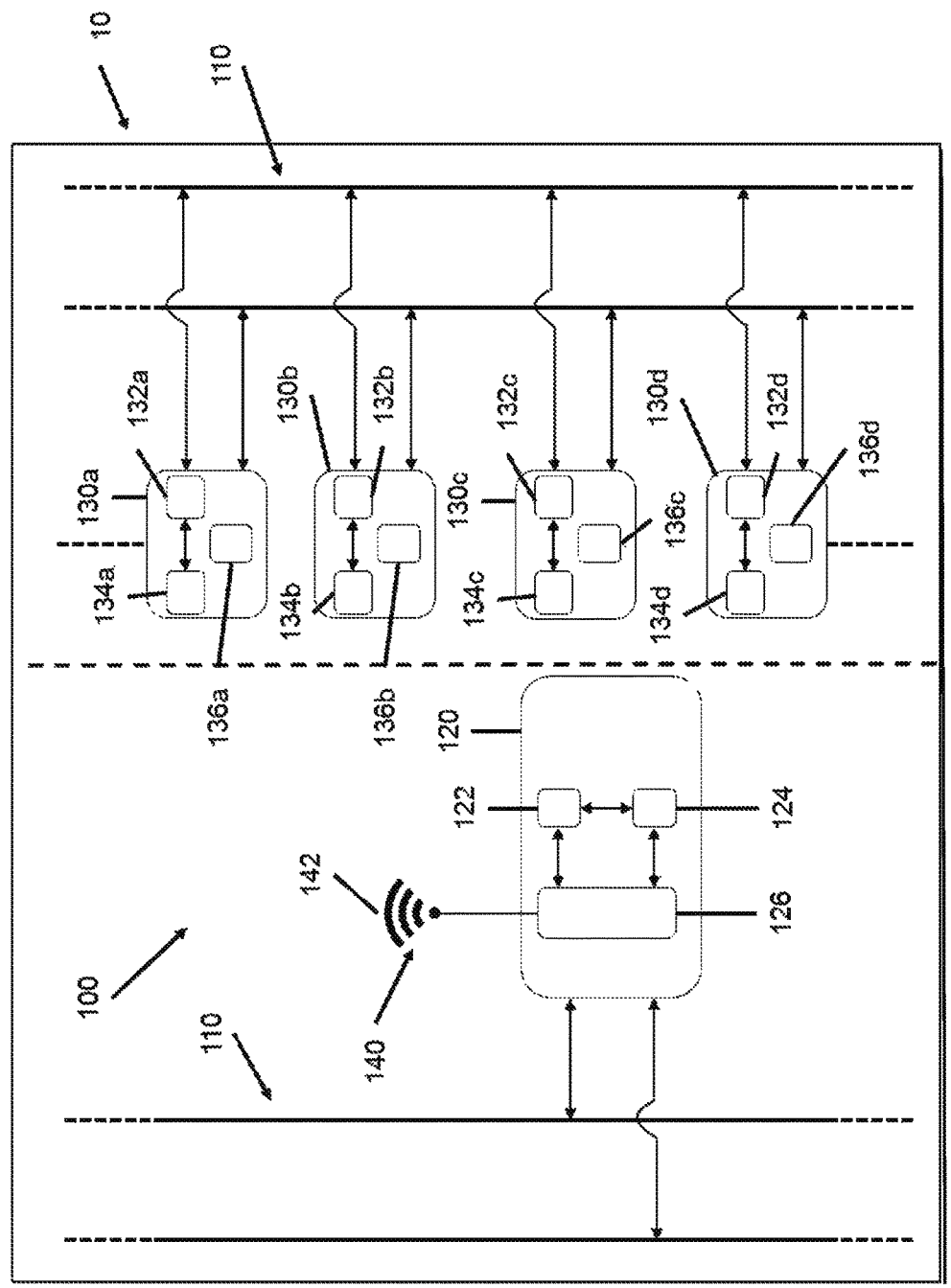
FIG. 1 is a block diagram illustrating a vehicle having a system for securing and authenticating a network in accordance with an exemplary embodiment.

The following detailed description is merely exemplary in nature and is not intended to limit the application and uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor module (shared, dedicated, or group) and memory module that executes one or more software or firmware programs, a combinational logic circuit, and/or other suitable components that provide the described functionality.

Referring to the figures, wherein like numerals indicate like parts throughout the several views, a vehicle 10 having a system 100 for authenticating and securing a network 140 is shown herein. In the exemplary embodiments, the vehicle 10 is an automobile. However, the system 100 may be implemented and/or utilized in other types of vehicles or in non-vehicle applications. For instance, other vehicles include, but are not limited to, aircraft, spacecraft, buses, trains, etc. As shown in FIG. 1, the system 100 includes a wired power line 110 and an electronic control module 120 having a processor module 122, a memory module 124, and a transceiver 126. The system 100 also includes a plurality of remote devices 130a-d having a plurality of remote processor modules 132a-d, a plurality of remote memory modules 134a-d, and a plurality of remote transceiver modules 136a-d. The remote devices 130a-d are in communication with and receive power from the wired power line 110.

With reference to FIG. 1, a non-limiting embodiment of the system 100 is provided. The vehicle 10 includes the wired power line 110 to supply electrical power to the electronic control module 120 and various remote devices 130a-d. In an example, the wired power line 110 supplies low-voltage direct current, however one skilled in the art will appreciate that various levels of voltage along with direct or alternating current may be supplied over the wired power line 110. Thus, the present disclosure is not limited to any specific type of wired power line 110. As known to those skilled in the art, the system 100 may include various electronic components (not shown) in its implementation and on the wired power line 110.

The vehicle 10 uses the wired power line 110 to supply electrical power to the electronic control module 120 and various remote devices 130a-d. One skilled in the art will appreciate that the remote devices 130a-d may include vehicle sensors, actuators, vehicle subsystems, or specific devices such as power windows and power locks. The remote devices 130a-d may include remote processor modules 132a-d, remote memory modules 134a-d, and remote transceivers 136a-d to facilitate sending and receiving of signals over the wired power line 110. In an example, four remote devices 130a-d are depicted, however one skilled in the art will appreciate that additional remote devices may be connected to the wired power line 110.

As shown in FIG. 1, a broken line is used to denote that the electronic control module 120 and the remote devices 130a-d are distant from one another. One skilled in the art will appreciate that the electronic control module 120 and the remote devices 130a-d may be distributed throughout the vehicle 10. The electronic control module 120 and the remote devices 130a-d are depicted throughout the figures in close proximity to one another for simplicity and to aid in understanding; however the position of the electronic control module 120 and the remote devices 130a-d relative to one another should not be interpreted as limiting upon the design of the system 100.

As known to those skilled in the art, power-line communication (PLC) carries data and signals over wired power lines 110 that are simultaneously used for electric power transmission. In the non-limiting embodiment of FIG. 1, the electronic control module 120 communicates with the remote devices 130a-d over the wired power line 110 using PLC. One skilled in the art will appreciate that PLC technology in a vehicle 10 may be implemented using a variety of protocols. Furthermore, as many remote devices 130a-d in vehicles require power from the wired power line 110, PLC can be used to deliver data and signals to remote devices 130a-d. However, one skilled in the art will also appreciate that vehicle PLC is not suitable for handling all communications between electronic control modules 120, remote devices 130a-d, and various vehicle subsystems due to the relatively low bandwidth of PLC.

In the non-limiting embodiment of FIG. 1, the electronic control module 120 and the remote devices 130a-d send and receive signals over a communication channel 140. In the non-limiting embodiment of FIG. 1, the communication channel is a wireless network 142. As known to those skilled in the art, the transceiver 126 and remote transceivers 136a-d comprise both a transmitter and receiver and allow for wireless communication between the electronic control module 120 and the remote devices 130a-d using the wireless network 142.

Using a wireless network 142 to facilitate communication between the electronic control module 120 and the remote devices 130a-d of the vehicle 10 is desirable as it reduces overall vehicle weight and allows for greater manufacturing and design flexibility. As such, communications over a wireless network 142 are a viable option to replace communication by wires, such as over a wired vehicle communication bus, in vehicles 10.

The electronic control module 120 has the processor module 122, the memory module 124, and transceiver 126. The transceiver 126 converts the data stream from the processor module 122 into the PLC protocol for transmission over the wired power line 110. The transceiver 126 further converts the data stream from the processor module 122 into the wireless network protocol for transmission over the wireless network 142. The electronic control module 120 generates and transmits instruction signals to the remote devices 130a-d to, for example, lock/unlock doors, actuate windows, etc. The electronic control module 120 may also receive feedback signals from the remote devices 130a-d, such as data from sensors or instructions from the remote devices 130a-d over the wireless network 142.

As known to those skilled in the art, network keys are used in wireless networks 142 to secure and authenticate devices communicating over the wireless network 142. In the non-limiting embodiment of FIG. 1, the electronic control module 120 generates and transmits at least one network key to the remote devices 130a-d over the wired power line 110. The network key is used by the remote devices 130a-d to generate a signed transmission having a signature which is used in communications with the electronic control module 120 to authenticate and encrypt the data stream transmitted by the remote devices 130a-d. In the non-limiting embodiment of FIG. 1, the electronic control module 120 uses PLC over the wired power line 110 to deliver security related information, such as network keys, to the remote devices 130a-d. The encrypted and/or signed data stream transmitted between the electronic control module 120 and the remote devices 130a-d is transferred over the wireless network. While the term data stream is used throughout the disclosure, one skilled in the art will appreciate that the term data stream includes the signature, sporadic datagrams, sensor data, switch state information, actuator commands, etc. The format of the data stream depends on the standard of the wireless network 142. In a non-limiting example, the wireless network 142 includes WiFi, ZigBee, and Bluetooth. In a non-limiting embodiment, the electronic control module 120 regenerates the network key based on a state of the data stream transmitted by the remote devices 130a-d over the wireless network 142. In a non-limiting embodiment, the state of the data stream includes the phase of the data stream, the amplitude of the data stream, and the frequency of the data stream. The regenerated network key is distributed from the electronic control module 120 to the remote devices 130a-d using PLC over the wired power line 110 to secure the wireless communication link between the electronic control module 120 and the remote devices 130a-d.

In a non-limiting embodiment, the electronic control module 120 regenerates the network key based on the state of the network 140 and, more specifically, the state of the wireless network 142. In a non-limiting embodiment, the state of the wireless network 142 includes wireless channel variations such as change in amplitude, phase, and frequency. In a non-limiting embodiment, state, or the variations thereof, of the wireless network 142 is used as the basis for regenerating the network key. A final network key is generated by the electronic control module 120 and distributed to the remote devices 130a-d using PLC over the wired power line 110 to secure the wireless communication link between the electronic control module 120 and the remote devices 130a-d.

In a non-limiting embodiment, state, or the variations thereof, of the wireless network 142 is used as the basis to generate the final network key locally at each of the electronic control module 120 and the remote devices 130a-d. The state of the wireless network 142 will be the same when observed from both the electronic control module 120 and the remote devices 130a-d. As such, the final network key is not distributed and is generated locally at each of the remote devices 130a-d and the electronic control module 120 in communication over the wireless network 142.

In a non-limiting embodiment, the electronic control module 120 regenerates the network key based on a predetermined event. In a non-limiting embodiment, the predetermined event includes a recalibration event, a maintenance event, a predetermined time event, and a regenerating request event. The regenerated network key is distributed from the electronic control module 120 to the remote devices 130a-d using PLC over the wired power line 110 to secure the wireless communication link between the electronic control module 120 and the remote devices 130a-d.

In a non-limiting embodiment, the recalibration event may occur when an anomaly is detected and the system 100 regenerates the network key. In a non-limiting embodiment, the maintenance event may occur when maintenance is performed on the vehicle 10, when the remote device 130a-d is replaced, when the remote device 130a-d is serviced, when the electronic control module 120 is replaced, or when the electronic control module 120 is serviced. In a non-limiting embodiment, the predetermined time event may occur after a predetermined amount of time. In a non-limiting embodiment, the predetermined amount of time is, for example, fifty minutes so that the network key is regenerated and distributed to the remote devices 130a-d every fifty minutes. However, one skilled in the art will appreciate that the exemplary predetermined amount of time is not limiting and that other predetermined amounts of time are contemplated by the present disclosure. In a non-limiting embodiment, the regenerating request event may occur when the electronic control module 120 receives a request to regenerate the network key from the remote devices 130a-d.

Figure 2:
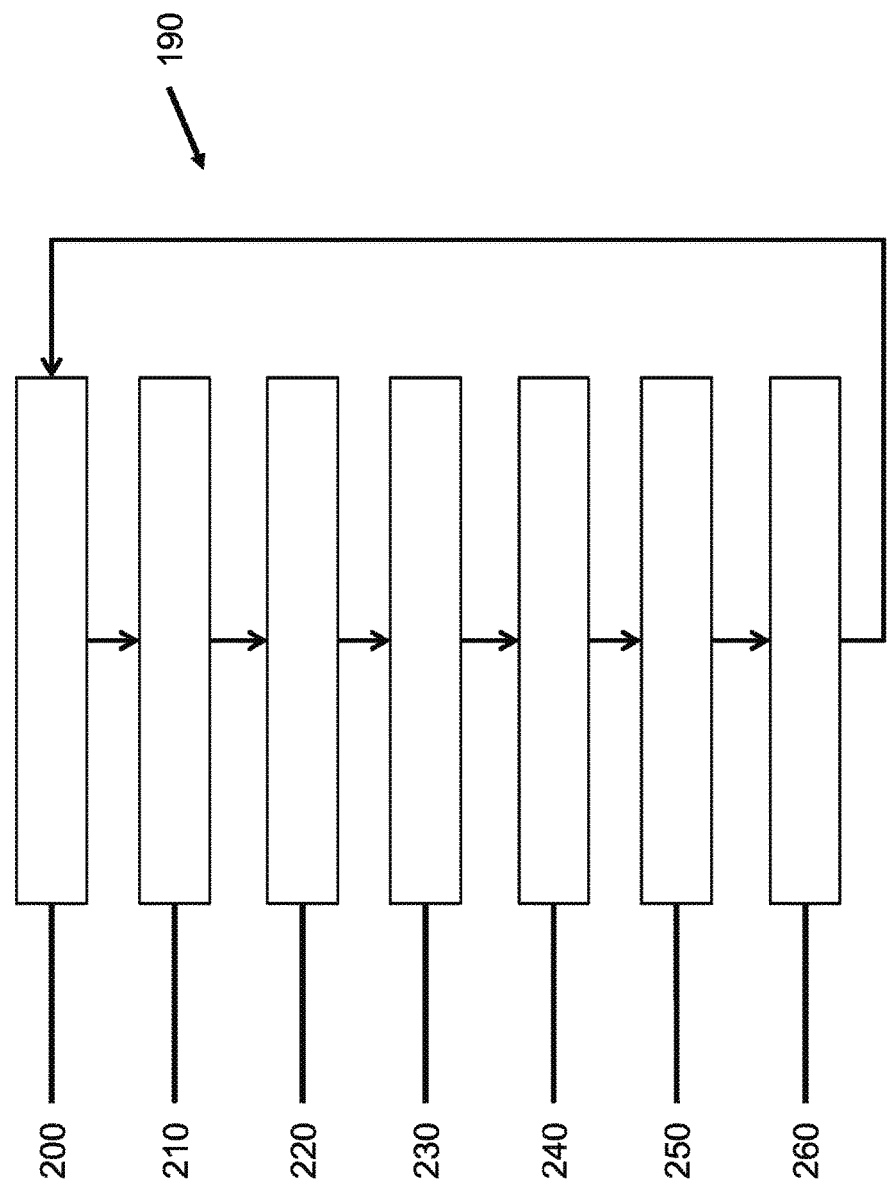
FIG. 2 is a flow chart illustrating a non-limiting example of a method for securing and authenticating a network with the system shown in FIG. 1.

Referring now to FIG. 2, and with continued reference to FIG. 1, a flowchart illustrates a method 190 performed by the system 100 of FIG. 1 in accordance with the present disclosure. As can be appreciated in light of the disclosure, the order of operation within the method is not limited to the sequential execution as illustrated in FIG. 2, but may be performed in one or more varying orders as applicable and in accordance with the requirements of a given application.

In various exemplary embodiments, the system 100 and method 190 are run based on predetermined events, and/or can run continuously during operation of the vehicle 10. Method 190 may be performed by system 100 or may be performed by any other suitable system configured in a manner consistent with the teachings of the present disclosure. The method starts at 200 with the generation of at least one network key by an electronic control module such as, but not limited to, the electronic control module 120. At 210, the at least one network key is distributed from the electronic control module to at least one of a plurality of remote devices such as, but not limited to, the remote devices 130a-d over a wired power line such as, but not limited to, the wired power line 110. At 220, the at least one network key is extracted from the wired power line by at least one of the remote devices. At 230, at least one signed transmission having a signature based on the network key is transmitted from at least one of the remote devices to the electronic control module over the communication channel separate from the wired power line.

At 240, the at least one signed transmission transmitted from at least one of the remote devices is received by the electronic control module. At 250, the electronic control module authenticates the at least one signed transmission. At 260, the electronic control module receives the encrypted data stream transmitted by at least one of the remote devices over the communication channel and returns to step 200 as necessary to authenticate additional remote devices.

In a non-limiting embodiment, the electronic control module 120 returns to step 200 and regenerates the network key based on a state of the data stream transmitted by the remote devices 130a-d over the wireless network 142. In a non-limiting embodiment, the state of the data stream includes the bitrate of the data stream, the size of the packets in the data stream, the content of the data stream, etc. The method proceeds through the steps as described above to distribute the regenerated network key from the electronic control module 120 to the remote devices 130a-d using PLC over the wired power line 110 to secure the wireless communication link between the electronic control module 120 and the remote devices 130a-d.

In a non-limiting embodiment, the electronic control module 120 returns to step 200 and regenerates the network key based on the state of the network 140 and, more specifically, the state of the wireless network 142. In a non-limiting embodiment, the state of the wireless network 142 includes wireless channel variations such as change in amplitude, phase, and frequency. In a non-limiting embodiment, state, or the variations thereof, of the wireless network 142 is used as the basis for regenerating the network key. A final network key is generated by the electronic control module 120 and distributed to the remote devices 130a-d using PLC over the wired power line 110 to secure the communication link between the electronic control module 120 and the remote devices 130a-d.

In a non-limiting embodiment, after regenerating the network key, the state, or the variations thereof, of the wireless network 142 is used as the basis to generate the final network key locally at each of the electronic control module 120 and the remote devices 130a-d. The state of the wireless network 142 will be the same when observed from both the electronic control module 120 and the remote devices 130a-d. As such, the final network key is not distributed and is generated locally at each of the remote devices 130a-d and the electronic control module 120 in communication over the wireless network 142.

In a non-limiting embodiment, the electronic control module 120 returns to step 200 and regenerates the network key based on a predetermined event. In a non-limiting embodiment, the predetermined event may include one or more of a recalibration event, a maintenance event, a predetermined time event, and a regenerating request event. The method proceeds through the steps as described above to distribute the regenerated network key from the electronic control module 120 to the remote devices 130a-d using PLC over the wired power line 110 to secure the wireless communication link between the electronic control module 120 and the remote devices 130a-d.

In a non-limiting embodiment, the recalibration event may occur when an anomaly is detected and the system 100 regenerates the network key. In a non-limiting embodiment, the maintenance event may occur when maintenance is performed on the vehicle 10, when the remote device 130a-d is replaced, when the remote device 130a-d is serviced, when the electronic control module 120 is replaced, or when the electronic control module 120 is serviced. In a non-limiting embodiment, the predetermined time event may occur after a predetermined amount of time. In a non-limiting embodiment, the predetermined about of time is, for example, fifty minutes so that the network key is regenerated and distributed to the remote devices 130a-d every fifty minutes. However, one skilled in the art will appreciate that the exemplary predetermined amount of time is not limiting and that other predetermined amounts of time are contemplated by the present disclosure. In a non-limiting embodiment, the regenerating request event may occur when the electronic control module 120 receives a request to regenerate the network key from the remote devices 130a-d.

In this way, the system 100 distributes the network key to at least one of the remote devices 130a-d using PLC over the wired power line 110 to secure and authenticate and encrypt the network 140. The network key is extracted by at least one of the remote devices 130a-d and the signed transmission is transmitted to the electronic control module 120 to authenticate and encrypt data streams sent over the communication channel of the network 140. In a non-limiting example, the network is a wireless network 142. When the signed transmission is authenticated and encrypted, the electronic control module 120 receives the data stream transmitted by at least one of the remote devices 130a-d.

Figure 3:
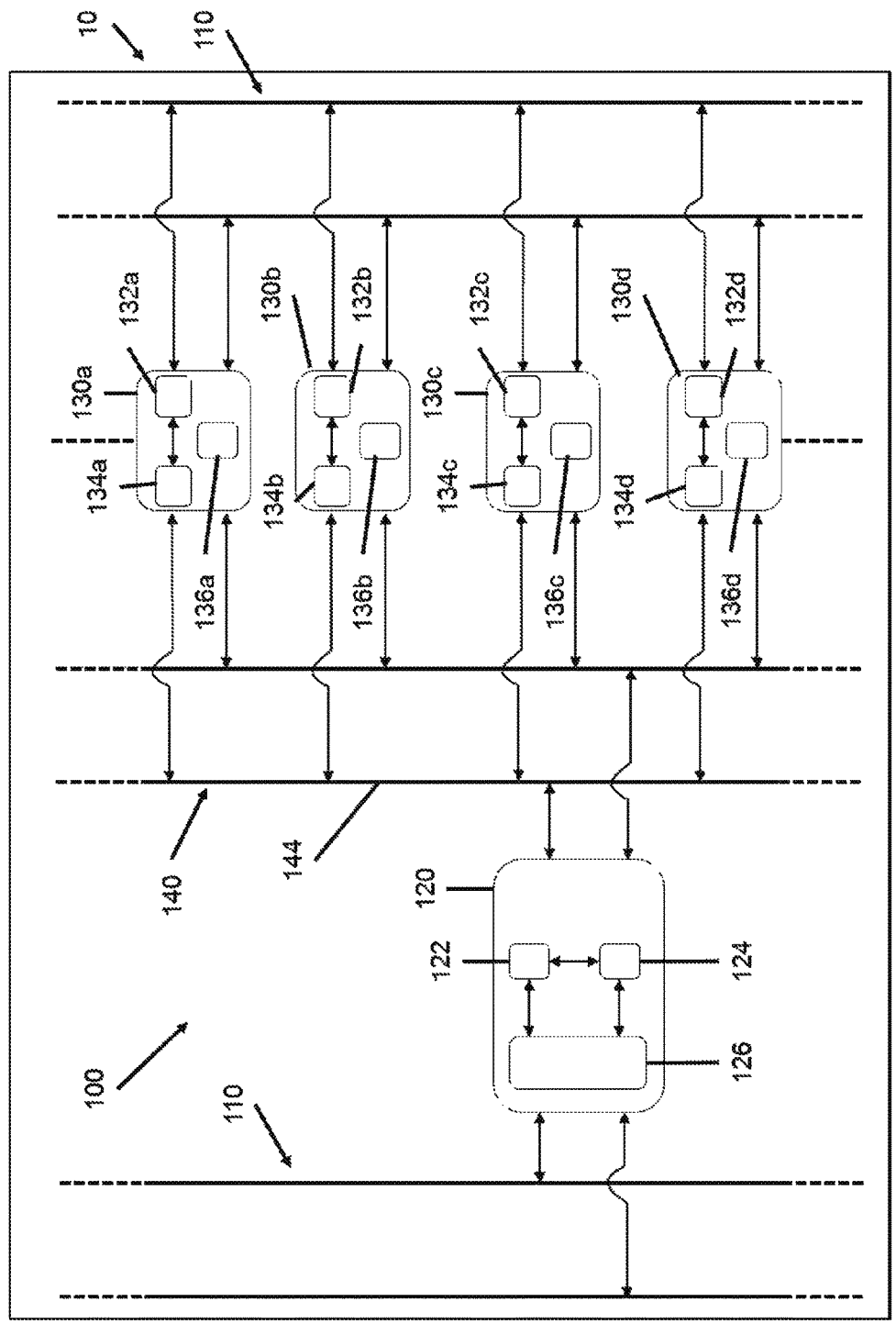
FIG. 3 is a block diagram illustrating the system for securing and authenticating a network in accordance with another exemplary embodiment.

With reference now to FIG. 3, a non-limiting embodiment of a system 101 for securing and authenticating a network 140 is provided. In this embodiment, the system 101 has a network 140 that includes a wired communication bus 144. With continuing reference to FIGS. 1-2, as similar components are used in the system 101 relative to the system 100, similar reference numerals will be used. As with the non-limiting embodiment from FIG. 1, the system 101 includes the wired power line 110, the electronic control module 120, and the remote devices 130a-d.

In a non-limiting example, the wired communication bus 144 is a CAN bus, however one skilled in the art will appreciate that various communication busses such as FlexRay, A2B, or other known communication busses may be implemented as the wired communication bus 144. Thus, the present disclosure is not limited to any specific type of wired communication bus 144 or protocol. Furthermore, while the components of the system 101 are depicted in communication through a direct connection for simplicity, one skilled in the art will appreciate that the system 101 may be implemented over the wired communication bus 144 in various arrangements and electrical connections. As known to those skilled in the art, the system 101 may include various electronic components (not shown) in its implementation and on the wired communication bus 144.

Similar to the non-limiting embodiment of the system 100 of FIG. 1, the system 101 secures, authenticates, and encrypts communications over the wired communication bus 144 between the electronic control module 120 and the remote devices 130a-d. The electronic control module 120 generates at least one network key and distributes the network key to the remote devices 130a-d over the wired power line 110. The remote devices 130a-d extract the network key from the wired power line 110 and transmit the signed transmission including the signature based on the network key to the electronic control module 120 over the wired communication bus 144 according to the protocol of the wired communication bus 144. In a non-limiting embodiment, the electronic control module 120 receives the signed transmission from the remote devices 130a-d over the wired communication bus 144. In a non-limiting embodiment, the electronic control module 120 verifies the signed transmission according the signature received from the remote devices 130a-d. As described above, the wired communication bus 144 is a communication channel separate from the wired power line 110.

The signed transmission is received by the electronic control module 120 and authenticated and encrypted. When the signed transmission is authenticated, the electronic control module 120 receives the data stream transmitted by at least one of the remote devices 130a-d over the wired communication bus 144.

In a non-limiting embodiment, the electronic control module 120 regenerates the network key based on a state of the data stream transmitted by the remote devices 130a-d over the wired communication bus 144. In a non-limiting embodiment, the state of the data stream includes the bitrate of the data stream, the size of the packets in the data stream, the content of the data stream, etc. The regenerated network key is distributed from the electronic control module 120 to the remote devices 130a-d using PLC over the wired power line 110 to secure the communication link between the electronic control module 120 and the remote devices 130a-d.

In a non-limiting embodiment, the electronic control module 120 regenerates the network key based on the state of the network 140 and, more specifically, the state of the communication bus 144. In a non-limiting embodiment, the state of the communication bus 144 includes channel variations such as change in amplitude, phase, and frequency. In a non-limiting embodiment, state, or the variations thereof, of the communication bus 144 is used as the basis for regenerating the network key. A final network key is generated by the electronic control module 120 and distributed to the remote devices 130a-d using PLC over the wired power line 110 to secure the communication link between the electronic control module 120 and the remote devices 130a-d.

In a non-limiting embodiment, state, or the variations thereof, of the communication bus 144 is used as the basis to locally generate the final network key at each of the electronic control module 120 and the remote devices 130a-d. The state of the communication bus 144 will be the same when observed from both the electronic control module 120 and the remote devices 130*a-d*. As such, the final network key is not distributed and is generated locally at each of the remote devices 130*a-d* and the electronic control module 120 in communication over the communication bus 144.

In a non-limiting embodiment, the electronic control module 120 regenerates the network key based on a predetermined event. In a non-limiting embodiment, the predetermined event includes a recalibration event, a maintenance event, a predetermined time event, and/or a regenerating request event. The regenerated network key is distributed from the electronic control module 120 to the remote devices 130*a-d* using PLC over the wired power line 110 to secure the wireless communication link between the electronic control module 120 and the remote devices 130*a-d*.

In a non-limiting embodiment, the recalibration event may occur when an anomaly is detected and the system 101 regenerates the network key. In a non-limiting embodiment, the maintenance event may occur when maintenance is performed on the vehicle 10, when the remote device 130*a-d* is replaced, when the remote device 130*a-d* is serviced, when the electronic control module 120 is replaced, or when the electronic control module 120 is serviced. In a non-limiting embodiment, the predetermined time event may occur after a predetermined amount of time. In a non-limiting embodiment, the predetermined amount of time is, for example, fifty minutes so that the network key is regenerated and distributed to the remote devices 130*a-d* every fifty minutes. However, one skilled in the art will appreciate that the exemplary predetermined amount of time is not limiting and that other predetermined amounts of time are contemplated by the present disclosure. In a non-limiting embodiment, the regenerating request event may occur when the electronic control module 120 receives a request to regenerate the network key from the remote devices 130*a-d*.

Figure 4:
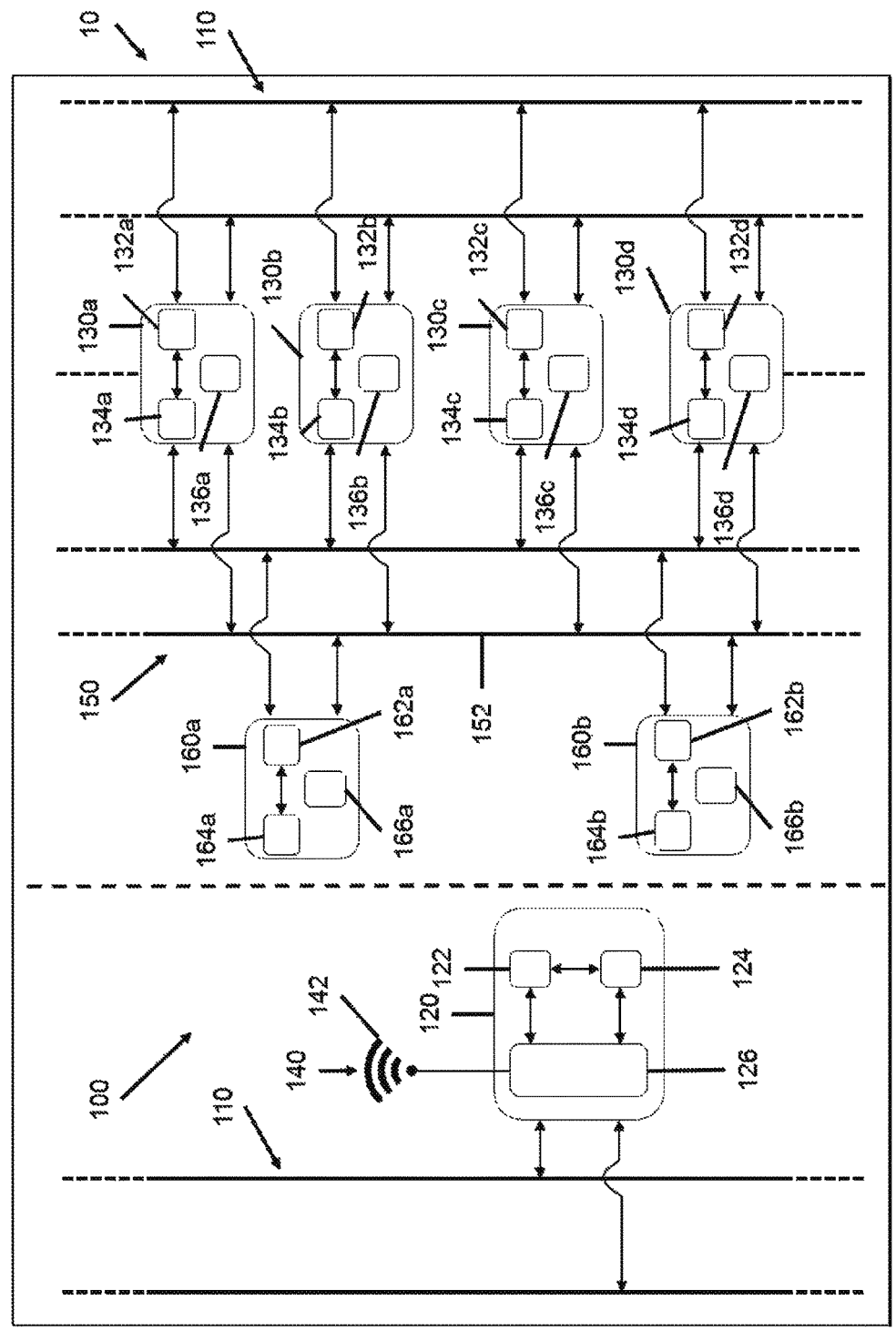
FIG. 4 is a block diagram illustrating the system for securing and authenticating a network in accordance with another exemplary embodiment.

With reference now to FIG. 4, a non-limiting embodiment of the system 102 for securing and authenticating a network 140 is provided. In this embodiment, the system 102 has a network 140 that includes the wireless network 142. The system 102 further includes a shared device network 150 in communication with the remote devices 130*a-d* and a plurality of shared remote devices 160*a-b*. With continuing reference to FIGS. 1-3, as similar components are used in the system 102 relative to the systems 100, 101, similar reference numerals will be used. As with the non-limiting embodiment from FIGS. 1 and 3, the system 102 includes the wired power line 110, the electronic control module 120, and the remote devices 130*a-d*.

One skilled in the art will appreciate that the shared remote devices 160*a-b* may include vehicle sensors, actuators, vehicle subsystems, or specific devices such as power windows and power locks. The shared remote devices 160*a-b* may include remote processor modules 162*a-b*, remote memory modules 164*a-b*, and remote transceivers 166*a-b* to facilitate sending and receiving of signals over the shared device network 150 and the network 140. In an example, two shared remote devices 160*a-b* are depicted, however one skilled in the art will appreciate that additional shared remote devices 160*a-b* may be connected to the shared device network 150. The shared remote devices 160*a-b* may receive power from a power source other than the wired power line 110 such as a battery, solar panel, or other wired power line.

In a non-limiting example, the shared device network 150 is a wired shared communication bus 152. However, one skilled in the art will appreciate that the shared device network 150 may be a shared wireless network. Thus, the present disclosure is not limited to any specific type of shared device network 150 or protocol. Furthermore, while the components of the system 102 are depicted in communication through a direct connection for simplicity, one skilled in the art will appreciate that the system 102 may be implemented over the network 140, wired power line 110, and the shared device network 150 in various arrangements and electrical connections. As known to those skilled in the art, the system 102 may include various electronic components (not shown) in its implementation and on the network 140, wired power line 110, and the shared device network 150.

In a non-limiting embodiment of the system 102, the shared remote devices 160*a-b* are not in communication with the wired power line 110. Accordingly, the shared remote devices 160*a-b* do not receive the network key from the wired power line 110. In a non-limiting embodiment of the system 102, the electronic control module 120 generates at least one network key and distributes the network key to the remote devices 130*a-d* over the wired power line 110. The remote devices 130*a-d* extract the network key from the wired power line 110 and transmit the network key to the shared remote devices 160*a-b* using the shared device network 150.

The shared device network 150 is separate from the wired power line 110 and the network 140. The network key is received by the shared remote devices 160*a-b* and the signed transmission including the signature is transmitted to the electronic control module over the network 140. The electronic control module receives the signed transmission and authenticates and encrypts a shared remote device data stream from the shared remote devices 160*a-b* based on the signed transmission.

In a non-limiting embodiment, the electronic control module 120 regenerates the network key based on a state of the data streams transmitted by the remote devices 130*a-d* and the shared remote devices 160*a-b* over the network 140. In a non-limiting embodiment, the state of the data streams includes the bitrate of the data stream, the size of the packets in the data stream, the content of the data stream, etc. The regenerated network key is distributed from the electronic control module 120 to the remote devices 130*a-d* using PLC over the wired power line 110 to secure the wireless communication link between the electronic control module 120 and the remote devices 130*a-d*. The regenerated network key is distributed from the remote devices 130*a-d* to the shared remote devices 160*a-b* using the shared device network 150 to secure the wireless communication link between the electronic control module 120 and the shared remote devices 160*a-b*.

In a non-limiting embodiment, the electronic control module 120 regenerates the network key based on the state of the network 140 and, more specifically, the state of the wireless network 142. In a non-limiting embodiment, the state of the wireless network 142 includes wireless channel variations such as change in amplitude, phase, and frequency. In a non-limiting embodiment, state, or the variations thereof, of the wireless network 142 is used as the basis for regenerating the network key. A final network key is generated by the electronic control module 120 and distributed to the remote devices 130*a-d* using PLC over the wired power line 110 to secure the wireless communication link between the electronic control module 120 and the remote devices 130*a-d*. The final network key is distributed from the remote devices 130*a-d* to the shared remote devices 160*a-b* using the shared device network 150 to secure the wireless communication link between the electronic control module 120 and the shared remote devices 160a-b.

In a non-limiting embodiment, state, or the variations thereof, of the wireless network 142 is used as the basis to generate the final network key locally at each of the electronic control module 120 and the remote devices 130a-d. The state of the wireless network 142 will be the same when observed from both the electronic control module 120 and the remote devices 130a-d. As such, the final network key is not distributed and is generated locally at each of the remote devices 130a-d and the electronic control module 120 in communication over the wireless network 142.

In a non-limiting embodiment, the electronic control module 120 regenerates the network key based on a predetermined event. In a non-limiting embodiment, the predetermined event includes a recalibration event, a maintenance event, a predetermined time event, and a regenerating request event. The regenerated network key is distributed from the electronic control module 120 to the remote devices 130a-d using PLC over the wired power line 110 to secure the wireless communication link between the electronic control module 120 and the remote devices 130a-d. The regenerated network key is distributed from the remote devices 130a-d to the shared remote devices 160a-b using the shared device network 150 to secure the wireless communication link between the electronic control module 120 and the shared remote devices 160a-b.

In a non-limiting embodiment, the recalibration event may occur when an anomaly is detected and the system 102 regenerates the network key. In a non-limiting embodiment, the maintenance event may occur when maintenance is performed on the vehicle 10, when the remote device 130a-d is replaced, when the remote device 130a-d is serviced, when the electronic control module 120 is replaced, or when the electronic control module 120 is serviced. In a non-limiting embodiment, the maintenance event may occur when maintenance is performed on the vehicle 10, when the shared remote device 160a-b is replaced, or when the shared remote device 160a-b is serviced.

In a non-limiting embodiment, the predetermined time event may occur after a predetermined amount of time. In a non-limiting embodiment, the predetermined about of time is, for example, fifty minutes so that the network key is regenerated and distributed to the remote devices 130a-d, and in turn the shared remote devices 160a-b, every fifty minutes. However, one skilled in the art will appreciate that the exemplary predetermined amount of time is not limiting and that other predetermined amounts of time are contemplated by the present disclosure. In a non-limiting embodiment, the regenerating request event may occur when the electronic control module 120 receives a request to regenerate the network key from the remote devices 130a-d. In a non-limiting embodiment, the regenerating request event may occur when the electronic control module 120 receives a request to regenerate the network key from the shared remote devices 160a-b.

While various exemplary embodiments have been presented in the foregoing detailed description, it should be appreciated that a vast number of variations exist. It should also be appreciated that the exemplary embodiments are only examples, and are not intended to limit the scope, applicability, or configuration of the disclosure in any way. Rather, the foregoing detailed description will provide those skilled in the art with a convenient road map for implementing the exemplary embodiments. It should be understood that various changes can be made in the function and arrangement of elements without departing from the scope of the disclosure as set forth in the appended claims and the legal equivalents thereof.

What is claimed is:

1. A method of securing and authenticating a network, comprising:
generating, by an electronic control module, at least one network key;
distributing, over a wired power line, the at least one network key from the electronic control module to at least one remote device;
extracting, by the remote device, the at least one network key from the wired power line;
generating, by the remote device, a signature based on the at least one network key;
transmitting, over a communication channel on the network separate from the wired power line, at least one signed transmission including the signature, from the at least one remote device to the electronic control module;
receiving, by the electronic control module, the at least one signed transmission from the at least one remote device;
authenticating the at least one signed transmission;
receiving, by the electronic control module, a data stream transmitted by the at least one remote device over the communication channel;
regenerating, by the electronic control module, the at least one network key based on at least one of a state of the data stream transmitted by the at least one remote device over the communication channel and a state of the communication channel; and
securing the communication channel between the electronic control module and the at least one remote device.

2. The method of claim 1, wherein the communication channel is a wireless network.

3. The method of claim 1, wherein the communication channel is a communication bus.

4. The method of claim 1, further comprising:
generating locally, by at least one of the electronic control module and the at least one remote device, at least one final network key, based on the regenerated network key; and
securing the communication channel between the electronic control module and the at least one remote device based on the final network key.

5. The method of claim 1, further comprising:
regenerating, by the electronic control module, the at least one network key based on a predetermined event comprising at least one of a recalibration event, a maintenance event, a predetermined time event, and a regeneration request event; and
securing the communication channel between the electronic control module and the at least one remote device.

6. The method of claim 1, further comprising:
sharing, by at least one shared remote device, the at least one network key from the at least one remote device;
transmitting, over the communication channel, the at least one signed transmission from the at least one shared remote device to the electronic control module;
receiving, by the electronic control module, the at least one signed transmission from the at least one shared remote device;
authenticating the at least one signed transmission; and receiving, by the electronic control module, a shared remote device data stream transmitted by the at least one shared remote device over the communication channel.

7. A system for securing and authenticating a network, comprising:
an electronic control module having a processor module and a memory module, the electronic control module configured to generate at least one network key, and send and receive signals over a communication channel on the network;
a wired power line network separate from the communication channel; and
at least one remote device configured to receive power from the wired power line network, send and receive signals over the communication channel, and generate a signature based on the at least one network key;
wherein the at least one network key is transmitted by the electronic control module over the wired power line network to the at least one remote device, and a data stream, including at least one signed transmission and the signature, transmitted by the at least one remote device to the electronic control module over the communication channel is authenticated and encrypted based on the at least one network key, and
wherein the at least one network key is regenerated based on at least one of a state of the data stream transmitted by the at least one remote device over the communication channel and a state of the communication channel, and the electronic control module secures the communication channel with the at least one remote device based on the regeneration of the at least one network key.

8. The system of claim 7, wherein the communication channel is a wireless network.

9. The system of claim 7, wherein the communication channel is a communication bus.

10. The system of claim 7, wherein a final network key is generated locally based on the regenerated network key with at least one of the electronic control module and the at least one remote device, and the electronic control module secures the communication channel with the at least one remote device based on the final network key.

11. The system of claim 7, wherein the at least one network key is regenerated based on a predetermined event comprising at least one of a recalibration event, a maintenance event, a predetermined time event, and a regeneration request event, and the electronic control module secures the communication channel with the at least one remote device based on the regeneration of the at least one network key.

12. The system of claim 7, further comprising:
at least one shared remote device in communication with the at least one remote device over a shared device network,
wherein the at least one network key is transmitted by the at least one remote device to the at least one remote shared device over the shared device network and a shared remote device data stream, including at least one signed transmission, transmitted by the at least one shared remote device to the electronic control module over the communication channel is authenticated and encrypted based on the at least one network key.

13. A vehicle, comprising:
a network; and
a system for securing and authenticating the network, the system comprising:
an electronic control module having a processor module and a memory module, the electronic control module configured to generate at least one network key, and send and receive signals over a communication channel on the network;
a wired power line network separate from the communication channel; and
at least one remote device configured to receive power from the wired power line network, send and receive signals over the communication channel, and generate a signature based on the at least one network key;
wherein the at least one network key is transmitted by the electronic control module over the wired power line network to the at least one remote device, and a data stream, including at least one signed transmission and the signature, transmitted by the at least one remote device to the electronic control module over the communication channel is authenticated and encrypted based on the at least one network key, and
wherein the at least one network key is regenerated based on at least one of a state of the data stream transmitted by the at least one remote device over the communication channel and a state of the communication channel, and the electronic control module secures the communication channel with the at least one remote device based on the regeneration of the at least one network key.

14. The vehicle of claim 13, wherein the communication channel is a wireless network.

15. The vehicle of claim 13, wherein the communication channel is a communication bus.

16. The vehicle of claim 13, wherein the at least one network key is regenerated based on a predetermined event comprising at least one of a recalibration event, a maintenance event, a predetermined time event, and a regeneration request event, and the electronic control module secures the communication channel with the at least one remote device based on the regeneration of the at least one network key.

17. The vehicle of claim 13, further comprising:
at least one shared remote device in communication with the at least one remote device over a shared device network,
wherein the at least one network key is transmitted by the at least one remote device to the at least one remote shared device over the shared device network and a shared remote device data stream, including at least one signed transmission, transmitted by the at least one shared remote device to the electronic control module over the communication channel is authenticated and encrypted based on the at least one network key.

* * * * *